Nov. 8, 1955     E. VROOM     2,723,308

AUTOMATIC TRANSCRIBING SYSTEM

Filed March 19, 1953     8 Sheets-Sheet 1

| FIG.3 | FIG.4 | FIG.5 | FIG. 6 |

| FIG.8 | FIG.9 | FIG.10 | FIG.12 |
| | | FIG.11 | |

INVENTOR
E. VROOM
BY
J. W. Schmied
ATTORNEY

Nov. 8, 1955 — E. VROOM — 2,723,308

AUTOMATIC TRANSCRIBING SYSTEM

Filed March 19, 1953 — 8 Sheets-Sheet 2

FIG.3

INVENTOR
E. VROOM
BY
J. W. Schmied
ATTORNEY

FIG.5

INVENTOR
E. VROOM
BY
J. W. Schmied
ATTORNEY

Nov. 8, 1955  E. VROOM  2,723,308
AUTOMATIC TRANSCRIBING SYSTEM
Filed March 19, 1953  8 Sheets-Sheet 5

FIG. 8

INVENTOR
E. VROOM
BY
J. W. Schmied
ATTORNEY

Nov. 8, 1955  E. VROOM  2,723,308
AUTOMATIC TRANSCRIBING SYSTEM
Filed March 19, 1953  8 Sheets-Sheet 6

FIG.9

INVENTOR
E. VROOM
BY
J.W. Schmied
ATTORNEY

United States Patent Office 2,723,308
Patented Nov. 8, 1955

2,723,308

AUTOMATIC TRANSCRIBING SYSTEM

Edward Vroom, Tarrytown, N. Y., assignor to Bell Telephone Laboratories, Incorporated, New York, N. Y., a corporation of New York Application March 19, 1953, Serial No. 343,327

9 Claims. (Cl. 178—26)

This invention relates to automatic message accounting systems and more particularly to an automatic scanning system for transcribing film record to paper tape record.

In telephone message accounting systems the reading of message registers is a relatively expensive and slow procedure. Each message register provides for two sets of digits with the first being the subscriber's number and the second being a cumulative number indicating the number of message units charged to the subscriber. Photographs are taken at the end of each billing period of blocks of the registers which are compared by clerks with similar photographs taken at the end of the previous billing period. The differences of the message unit numbers of a subscriber for the two periods are utilized by the clerk in computing the charge.

It is an object of the present invention to provide for an automatic scanning system for reading the message registers that obviates the reading and computation by clerks.

This object is accomplished by projecting the film records onto a target of photocells arranged in a pattern. The shadows cast by the digits on the film leave different combinations of photocells in the pattern exposed. The energization of the specific combination of photocells causes the operation of associated circuits to energize a corresponding combination of perforating relays. The combination or code is thus automatically perforated on an automatic message accounting tape which may be employed in conjunction with various automatic message accounting systems to have the charge automatically computed. After a set of digits has been recorded by the perforations on the tape, the film is advanced automatically to a new set of digits until the entire 10,000 or more message registers have their recordings transcribed from film to perforated tape coding.

It is then another object of the present invention to provide for means to automatically transcribe filmed message register records to an AMA paper tape.

Still another object of the present invention is the provision of stepping mechanism that automatically steps off a film containing five columns of unit areas, where each unit area is a photograph of a message register and contains the subscriber's number and the number of message units corresponding to it.

Further objects and adavntages will become apparent to those skilled in the art upon consideration of the following description taken in conjunction with the drawings wherein.

Figure 2:
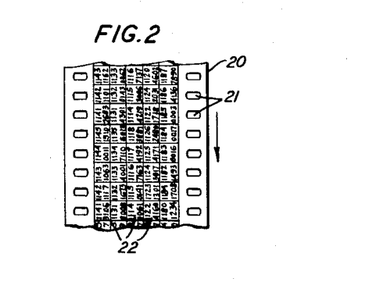
Fig. 2 is a fragmentary view of the film strip utilized in the present invention.

In computing the charges for the telephone subscriber photographs are periodically taken of the message registers whereon the number of message units are indicated. Referring to Fig. 2, a typical film strip 20 is illustrated having sprocket holes 21 aligned along each border and a plurality of unit areas 22. The areas 22 are arranged in five columns across the width of the film 20. Each area 22 is .15 inch by .18 inch and contains two numbers thereon so that there are ten numbers between the borders of the film strip 20. The digits upon the film 20 are shaded whereas the remainder of the area 22 is transparent. The top number or the numbers to the left in each unit 22 of Fig. 2 represent the message register numbers and the bottom numbers the message unit charged to the subscribers. The film record or strip 20 is in the preferred modification, a 35 millimeter film of approximately thirty-five feet long, containing a record of 10,000 message registers; 2000 in each column. The manner of obtaining the film record of the message registers is well known in the art as exemplified by the Patent 2,608,920 which issued to H. J. Smith on September 2, 1952, wherein the registers are photographed in blocks of twenty-five on a continuous strip of 35 millimeter film.

Figure 1:
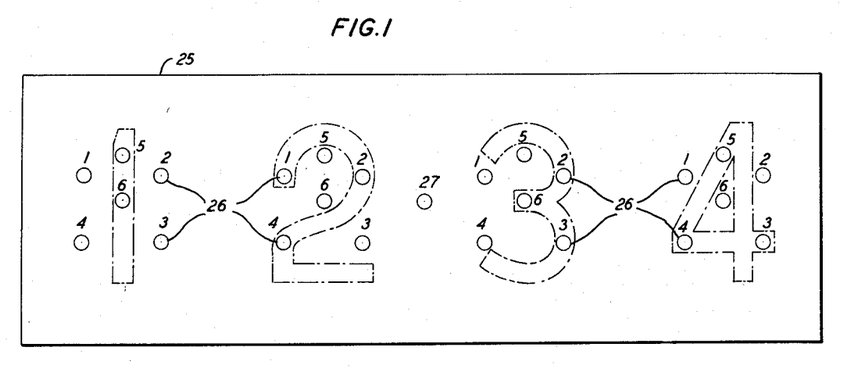
Fig. 1 is a front view of the photocell screen of a first modification of the present invention illustrating the shadows cast by various digits.
Figure 3:
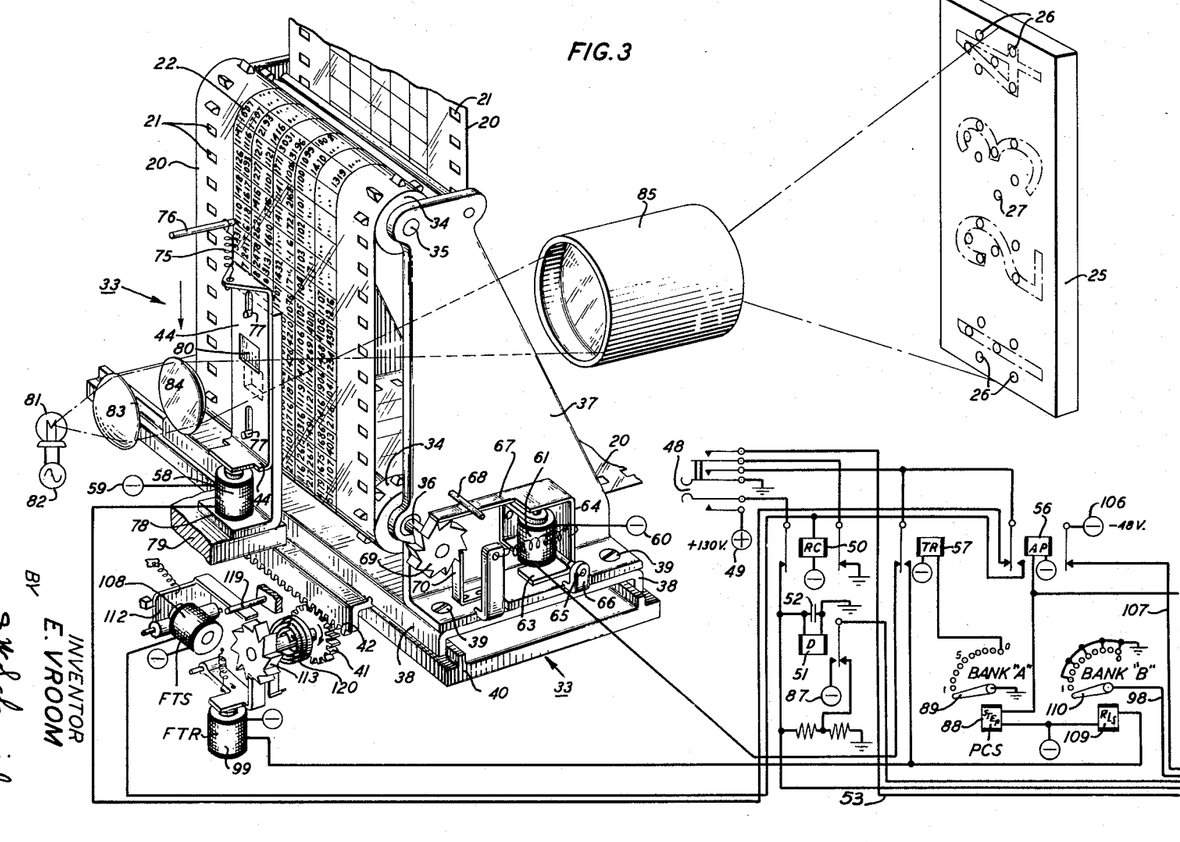
Figs. 3, 4 and 5, when arranged in accordance with Fig. 6, are partial pictorial and partial circuit representations of the first modification of the present invention.

The film record 20 is projected by means of the apparatus shown in Fig. 3 onto a photocell screen, bank or array 25 containing holes or lenses 26 and 27 which are shown in Fig. 1 as well as Fig. 3. The film record 20 is automatically moved successively in such a manner, hereinafter described, as to have the numbers in each of the 10,000-unit areas 22 projected upon the bank 25. Each digit of the numbers in the units 22 is projected upon one of the four-digit array of lenses 26 on the bank 25 where each array comprises six lenses 26 arranged in a similar definite pattern. The shadows cast by the ten possible digits provide, as is hereinafter described, for ten different combinations of illuminated lenses 26 in the digit array. The film 20 is advanced automatically after each area 22 has been read until the entire 10,000 are transcribed. The entire operation of transcribing the 10,000 areas 22 would require only approximately twenty-five minutes.

Figure 4:
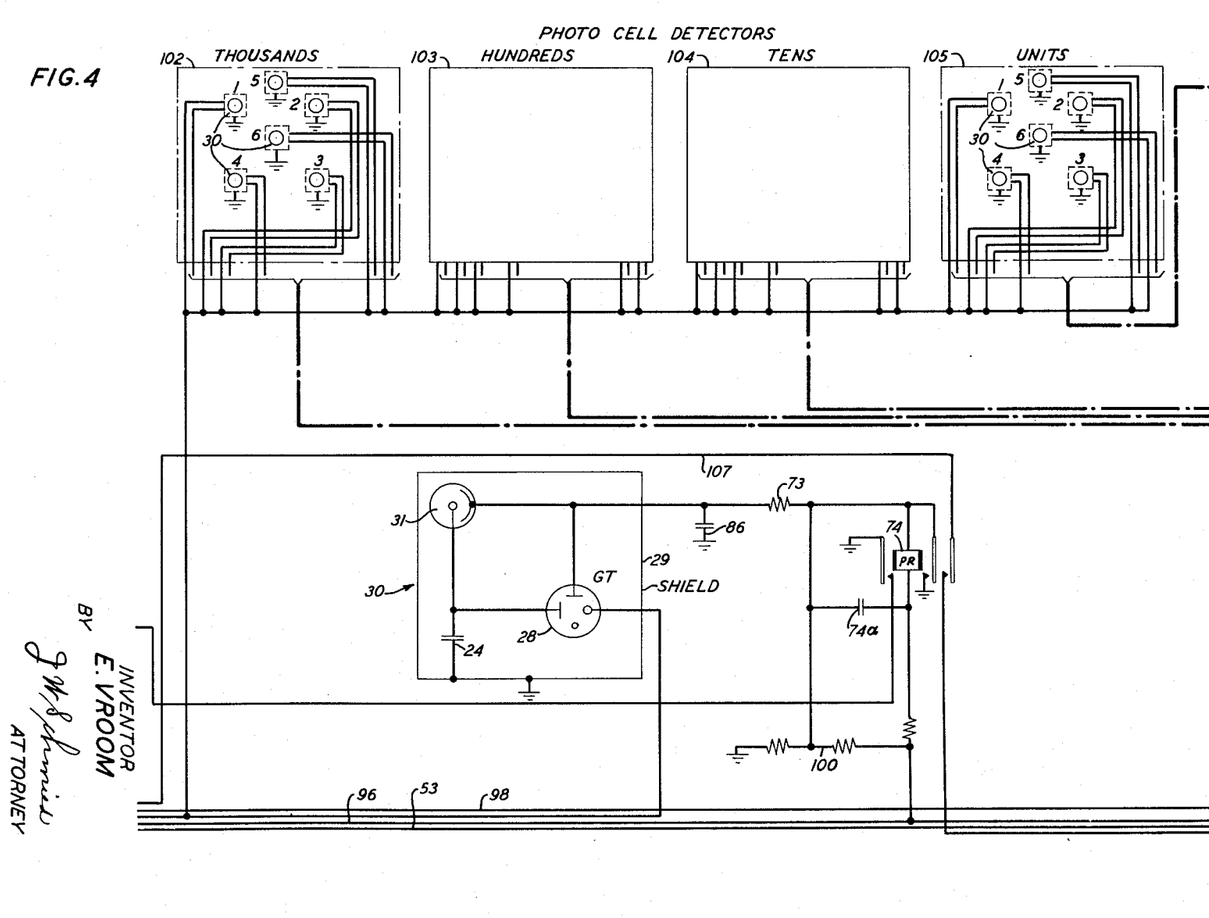
Figure 5:
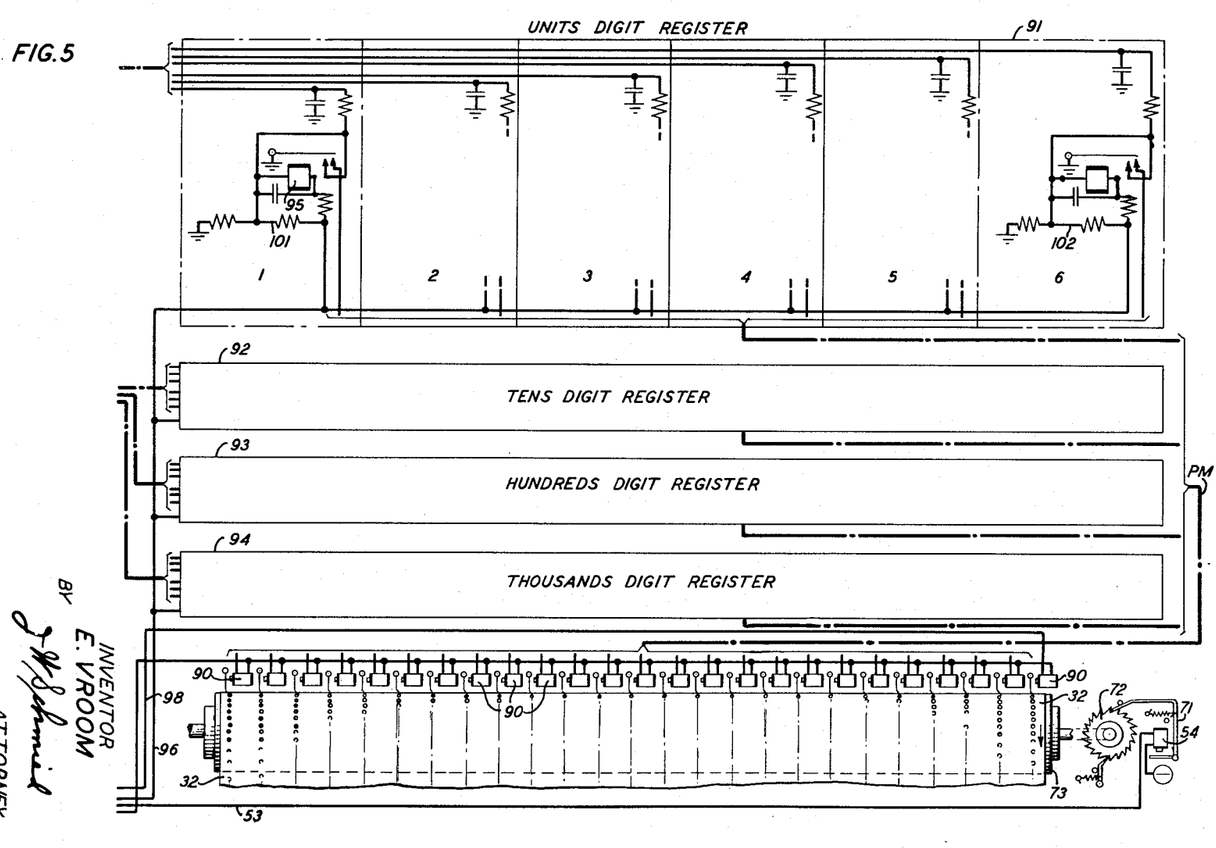
Figure 6:
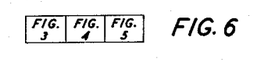
Fig. 6 illustrates the arrangement of Figs. 3, 4 and 5.

The individual record or area 22 is approximately one-tenth the actual size of the message register and is enlarged to give an image upon the screen 25 of approximately 1.875 inches high by 1.250 inches wide for each digit. The four digits which make up the message register number or the record of the four cyclic counters giving the number of message units are projected onto the target or screen 25 which presents an area of 3.5 inches by 9 inches. The holes or lenses 26 are approximately .15 inch in diameter and are arranged in the symmetrical manner shown in Figs. 1 and 3. The light passing through lenses 26 impinges upon an associated photoelectric cell, such as 31, shown in Fig. 4 which operates, as is hereinafter described, to provide a perforation upon the AMA paper tape 32, in Fig. 5. The complete scanning or reading system for transcribing the film record 20 into a perforated tape 32 which is suitable for use in AMA systems or the like is shown in Figs. 3, 4 and 5 when arranged in accordance with Fig. 6. The invention is not necessarily restricted to the transposition of digits as it may readily be adapted for transposing characters or other symbols as well.

The scanner or projector 33 has four sprocket wheels 34 upon which the film record 20 has been threaded with the sprocket of the wheels 34 engaging the sprocket holes 21. The upper and lower pairs of wheels 34 are supported by the shafts or axles 35 and 36, respectively, which are in turn supported by the brackets or side members 37. The two brackets 37 are bolted, screwed or otherwise fastened to the carriage or movable base 38 by the fasteners 39. The movable base 38 slides upon the fixed base 40 and is driven or stepped, as is hereinafter described, through the pinion 41 and gear 42. The film 20 may be in this manner moved laterally by the pinion 41 and longitudinally by the sprocket wheels 34 in front of a shutter 44. Light from a source 81 is passed through an optical system, hereinafter described, the shutter 44 and film 20 to impinge upon the screen 25 described above.

After the film record 20 has been threaded upon the wheels 34, the sequence of operation for transcribing the film record 20 to perforations on the paper tape 32 is commenced when the start key 48 is operated. The operation of the start key 48 closes the plus 130-volt battery 49, through its lower operated contact, and the normal contact of relay 50 to the winding of relay 51, bridged by the capacitor 52, causing relay 51 to operate. The operation of the start key 48 also closes ground from the right normal contact of relay 50, through the top set of contacts of key 48, to lead 53, to the stepper magnet 54, and ground through the middle contact of key 48 to the back normal contact of relays 56 and 57. The back contact of relay 56 is connected through the shutter magnet 58 to the battery 59 so that the magnet 58 operates when key 48 is operated. The back contact of relay 57 is connected through the film advance magnet 61 to the battery 60 and magnet 61 is thus also operated. In this manner the operation of the start key 48 provides operating paths for relay 51 and for electromagnets 54, 58 and 61.

The electromagnet 61 has associated therewith an armature 63 which is supported by a flexible bracket 64. The bracket 64 is pivoted on shaft 65 which is supported by the bracket 37, described above, and by angle 66. When the magnet 61 is energized the armature 63 is pulled up causing the bracket 64 to rotate in a clockwise manner about shaft 65. The upper arm 67 of the flexible bracket 64 bears against the pin 68 and the ratchet wheel 69. The pin 68 is supported by the bracket 37 and the wheel 69 is mounted on shaft 36. The rotation about shaft 65 causes the arm 67 to slide against pin 68 and move or click to the next clockwise step of ratchet wheel 69 as shown in Fig. 3. The wheel 69 cannot rotate in a clockwise manner due to the clockwise stop 70 which is affixed to the bracket 37 and so remains stationary when the magnet 61 is energized. Similarly when the magnet 54 in Fig. 5 is energized rotating the bracket 71, the ratchet wheel 72 and the perforated tape drum 73 affixed thereto and thus rotatable therewith remain stationary. The operation, however, of the shutter magnet 58 described above and shown in Fig. 3, causes the shutter 44 to move down resiliently deforming the spring member 75 supported on the pin 76. The pin 76 is mounted by means, not shown, upon the stationary base 40. The shutter 44 is prevented from moving laterally by the pins 77 which are supported by the vertical arm 78 which also supports the magnet 58. The vertical arm 78 is in turn supported by the stationary member 79. When the shutter 44 moves down upon the energization of magnet 58, the opening 80 in shutter 44 is moved into the path of the light rays from the light source 81. The light source 81 is energized by the power source 82 and provides light to the shutter 44 through the lenses 83 and 84. The lenses 83 and 84 are part of an optical system which also contains the focusing lenses 85 for providing the illumination of the film 20 upon the target 25. The light from the source 81 passes in this manner through lens 83, lens 84, the opening 80 in shutter 44, a unit 22 upon the film record 20 and the lenses 85 to fall upon the screen 25 described above. The lenses 85 act as a magnifier for the image cast by the area 22 of the film record 20 and the lenses 83 and 84 act as a collimator for the light from the source 81.

Behind each of the lenses or holes 26 and 27 in the screen 25 a photocell is positioned so that light through the film record 20 falling upon the target 25 activates at least one of the photocells in each of the four-digit patterns and also activates the pilot photocell 31 behind the lens 27. The photocell units or representations, hereinafter described, for the four digits which are located behind the lenses 26 are shown in Fig. 4 and are identified by the number 30 and arranged in groups or arrays designated detectors 102 through 105. In the specific embodiment employed herein the shadows upon the target 25 are from the number of message units which is 1234 from the subscriber whose number is 1168.

As shown in Figs. 1 and 3, the shadows cast by the digits cover certain definite combinations of photocells. If the lenses representing photocell units 30 are designated from 1 to 6, as shown in Fig. 1 for the thousand array of lenses 26, the shadow cast by digit 1 covers the lenses 5 and 6; by the digit 2 covers the lenses 1, 2, and 4; by the digit 3 covers the lenses 2, 3 and 6; by the digit 4 covers the lenses 3, 4 and 5; by the digit 5 covers the lenses 1, 3 and 6; by the digit 6 covers the lenses 1, 3 and 4; by the digit 7 covers the lens 6; by the digit 8 covers the lenses 1, 2, 3, 4 and 6; by the digit 9 covers the lenses 1, 2, 3 and 6; and by the digit 0 covers the lenses 1, 2, 3 and 4. For each digit therefor, unique combinations of lenses 26 are exposed and covered. The digits upon the registers are in perfect alignment and are prevented by means, not shown, from changing their reading during the photographic procedure.

The lenses 26 that are exposed allow light to pass therethrough to impinge upon the photocell units 30. Each photocell unit 30 contains a photocell, such as 31, which is in the specific embodiment, the photocell behind lens 27, a gas tube, such as tube 28, a shield 29 and a capacitor 24. The capacitor 24 is connected from the grounded shield 29 to cathode of photocell 31 and to the starting anode of tube 28. The tube 28, photocell 31 and capacitor 24 are all enclosed as a shielded unit one-half inch in diameter and six inches long in the shield 29. The present invention is however not necessarily restricted to the use of such a unit as any light responsive apparatus may be utilized, as for example a phototransistor.

When light through the area 22 having a message units number of 1234 falls upon the target 25, combinations of the photocell units 30 in detectors 102 through 105 operate as described above in detector 102; the thousands photocell units 1, 2, 3 and 4 operate; in detector 103 the hundreds photocell units 3, 5 and 6 operate; in detector 104 the tens photocell units 1, 4 and 5 operate; and in detector 105 the units photocell units 1, 2 and 6 operate. The photocell 31 is always energized as it is situated behind the lens 27 which is not shaded by any area 22. The energization of photocell 31 causes the gas tube 28 to break down since its cathode and the cathodes of all the tubes in units 30 as well are connected to the negative battery 87 through the operated contact of relay 51. Each of the photocell units 30, as described above, contains a gas triode, a capacitor and a photocell connected in a similar manner as the elements 31 and 28, 29 and 24. There are three external connections to each unit 30; a ground connection from the shield; a connection to the contact of relay 51 from the cathode of the gas tube; and a connection from the main anode of the gas tube to an individually associated register relay such as relay 74 which is connected to the main anode of tube 28 through the resistor 73. The main anodes of the gas tubes in the units 30 are also connected to ground through a shunting capacitor such as capacitor 86 which is connected to the tube 28.

When the light impinges upon the target 25 the cathodes of the gas tubes in photocell units 30 have already been connected to battery 87 and the main anodes have been connected to battery 49 through voltage dividers such as 100, 101, 102, etc., lead 96 and the lower contact of key 48. The photocell units 30 are responsive to the energization from light source 81 when the connections have been established, as described above, to the batteries 87 and 49. The light impinging upon the photocell, as for example photocell 31, breaks down the resistance of the photocell 31 and allows the starting anode of tube 28 to become positive to initiate the ionization of the starting gap which thereafter transfers across the main gap. When ionization commences the current through the winding of relay 74 shunted by capacitor 74a causes it to operate.

The register relays and associated circuitry which correspond to the units digits are arranged along the top of Fig. 5 with the tens, hundreds and thousands registers arranged beneath and shown in box diagram. The units digit register is designated 91, and the tens, hundreds and thousands registers are designated 92, 93 and 94, respectively. There are six register relays in each register, or twenty-five in all including register relay 74, described above. The shadows cast by the number 1234 upon the target 25 energize, as described above, 1, 2 and 6 of the photocell units 30 in the units photocell detector 105. The 1 photocell unit 30 operates and provides an operating path for register relay 95 which is the first register relay of register 91. The relays are arranged from left to right in Fig. 5 with the relay corresponding to the 1 photocell unit 30 being at the left. The first, second and sixth register relays operate in this manner in the register 91; the 1, 4 and 5 relays in register 92; the 3, 5 and 6 relays in register 93; and the 1, 2, 3 and 4 relays in register 94. The operation of a relay, as for example relay 95, closes ground to an associated perforating magnet 90 and also locks to ground. In a similar manner each register relay that is energized locks to ground and closes ground to its associated perforator magnet 90. There are twenty-five perforator magnets 90, one associated with each register relay including relay 74. When register relay 74 operates, it closes minus 48 volts from battery 106 through lead 107 and its right-hand contact to the windings of the twenty-five perforator magnets 90. The magnets 90 which have their windings grounded by virtue of the operation of register relays in registers 91 through 94, as described above, operate and cause perforations to be made in the paper tape 32.

The operation of relay 74 also causes the minor switches 89 and 110 to step off-normal and rest upon their first or 1 terminal by closing an operating ground from its left contact to the stepper magnet 88. The switches 89 and 110 are connected together and move as a unit. The switch 89 is employed to count ten operations of the relay 74 which is equivalent to recording the ten sets of digits corresponding to five registers as read in a transverse manner upon the film record 20. The operation begins with the counter number of the first register and then the register number thereof and proceeds transversely through the fifth register in the transverse row and thereafter the film is returned to the position of the first register and is stepped longitudinally, as is hereinafter described, to present a new set of five register records. The switch 110 does not perform any function upon making contact with its first terminal. When the switch 110 contacts its even terminals it connects ground potential to lead 98 which is connected to the twenty-fifth perforator magnet 90 which is at the right as shown in Fig. 5. The tape 32 is therefore perforated under this magnet 90 during the even transcribing sequences of operation. This perforation would indicate that the number being transcribed is a subscriber number. In the specific embodiment employed herein the number 1234 is the number of message units so that the twenty-fifth magnet 90 or the magnet 90 associated with switch 110 and lead 98 is not operated.

The operating ground from the left contact of relay 74, described above, is also connected to the winding of relay 56 causing it to operate. When relay 56 operates, it opens the operating path for the shutter magnet 58 allowing the restoring spring 75 to close the shutter 44 or cut off the light therethrough from the light source 81. The operation of relay 56 also closes an operating path to the film transverse magnet 108 causing it to operate and step or click the film 20 transversely to bring the next set of four digits in front of the lower position of the shutter aperture 80. The operation of magnet 108 moves its armature 112 along pin 119 against the ratchet wheel 113 causing it and gear 41 to rotate and tighten spring 120. Relay 56 also opens the minus 48-volt supply 106 to lead 107 and the magnets 90 causing the operated of magnets 90 to release. Relay 56 also operates relay 50, described above, from ground at the middle contact of key 48, which in turn opens the plus 130-volt supply 49 to relay 51 and through the lead 96 to the register relays causing the operated thereof and relay 51 to release. Finally the operation of relay 50 also removes the ground connection to lead 53 to the stepper magnet 54 which causes the bracket 71 to rotate in a counterclockwise manner to move the ratchet wheel 72 one notch and thus advance the paper tape 32 to the next position.

When the register relays release, relay 74 also releases and in turn causes the release of relay 56. When relay 56 releases, it causes the reoperation of the shutter magnet 58, recloses the minus 48-volt source 106 to lead 107 and releases magnet 108. The reopening of the shutter 44 permits light to fall upon the lenses once again through a new set of digits which, in the present modification is 1168 to cause the associated register relays in registers 91 through 94 and the pilot register 74 to operate. The minor switches 89 and 110 are stepped to their second terminals and switch 110 closes ground over lead 98 to operate the twenty-fifth perforator magnet 90 in addition to the other magnets which have been grounded by the register relays. This twenty-fifth perforation, as described above, distinguishes the record on this line on the tape 32 as being the identification number of the subscriber. Succeeding operations proceeds as described above until the minor switch 89 has been stepped ten times. When switch 89 contacts its tenth terminal, relay 57 described above, is operated and closes the operating path for the film transverse return magnet 99 to release spring 120 to return the film transversely to its starting position. A stop, not shown, may be provided to limit the return to the initial position. The operation of relay 57 also causes the release of the film advance magnet 61, described above, which steps or advances the film longitudinally to the next row of five register records, and the operation of the release magnet 109 which restores the stepping switches 89 and 110 to normal or to starting position. The system is thereafter ready to start succeeding cycles of reading and perforating and shifting the film laterally for each number and longitudinally for each of ten numbers. The operation continues in this manner to automatically transcribe the intelligence upon the film 20 to the tape 32 until the 10,000 units 22 have been transcribed.

Figure 8:
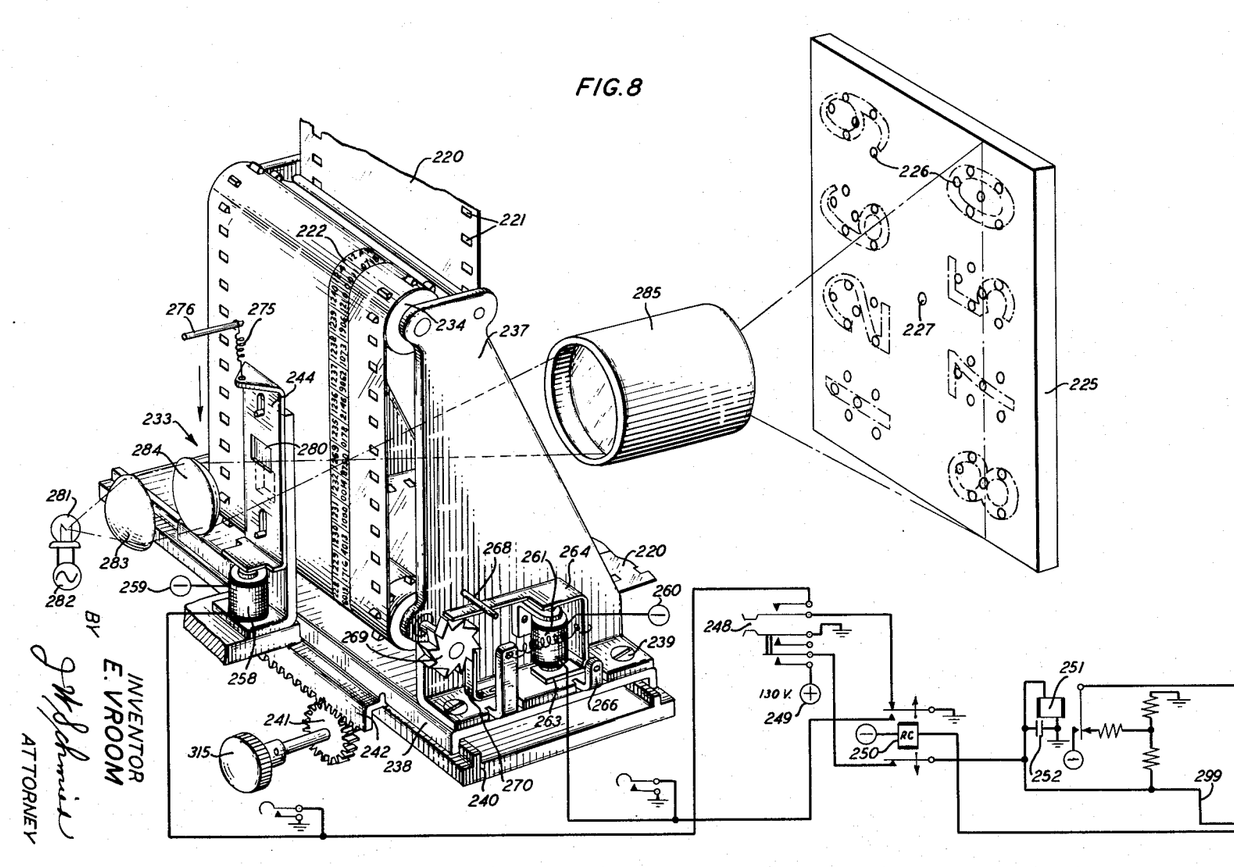
Figs. 8, 9, 10 and 11, when arranged in accordance with Fig. 12, are partial pictorial and partial circuit representations of the second modification of the present invention.
Figure 11:
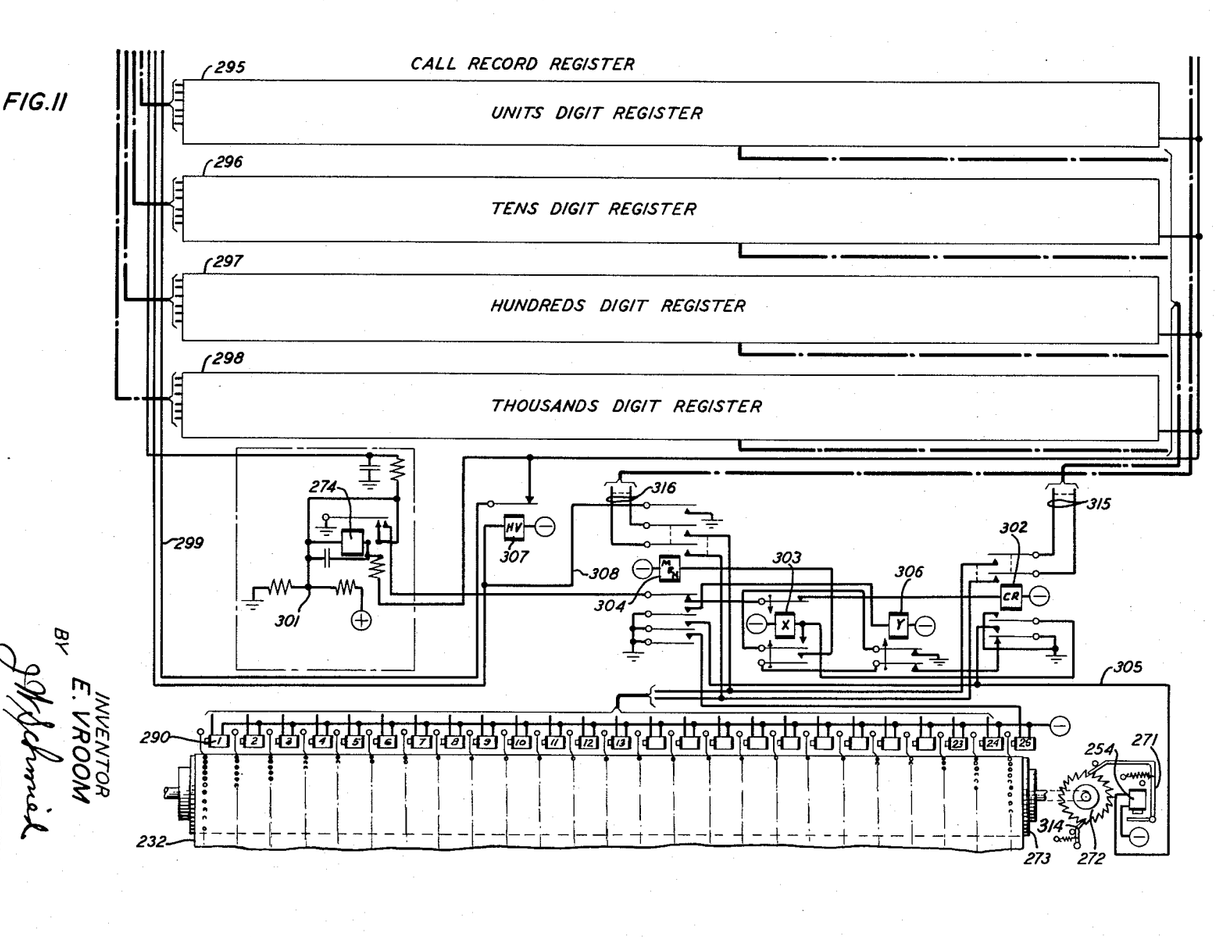
Figure 12:
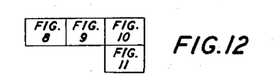
Fig. 12 illustrates the arrangement of Figs. 8, 9, 10 and 11.

In the modification shown in Figs. 8 through 11, when arranged in accordance with Fig. 12, a scanning or transcribing system is shown in accordance with the principles of the present invention wherein both the subscriber register number and the number of message units are simultaneously transcribed. The components or elements appearing in Figs. 8 through 11 which are similar to components in Figs. 3 through 5, described above, are designated by the same numbers plus 200. For example, the shutter shown in Fig. 8 is designated 244 whereas the shutter in Fig. 3 is designated 44.

Figure 7:
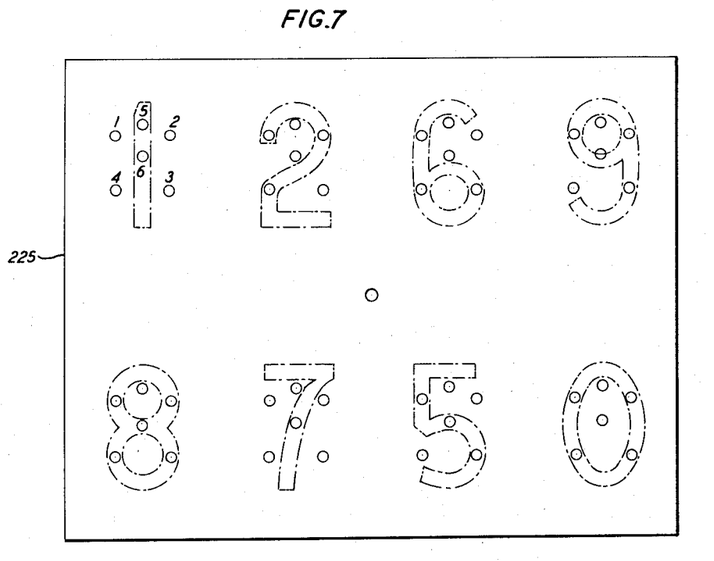
Fig. 7 is a front view of the photocell screen of a second modification of the present invention illustrating the shadows cast by various digits.

The two sets of four digits of an area or record 222 of film 220 are projected upon the target area 225 of approximately 7 inches by 9 inches shown specifically in Fig. 7. The target 225 has a pilot lens 227 and an array of eight sets of six holes 226 where each is arranged in a pattern as described above in reference to Figs. 1 and 3. In the specific embodiment shown herein the subscriber's message register number is 1269 and the number of message units is 8750. The shadows cast by these numbers leave combinations of the lenses 226 exposed, allowing the light to pass therethrough and activate the corresponding of the photocell units or detectors 230.

The following sequence of operation occurs when the start key 248 is closed and the film record 220 has been threaded upon the ratchet wheels 234. The operation of the key 248 connects the plus 130-volt battery 249 through the back contacts of relay 250, to lead 299 and to relay 251 bridged by capacitor 252. The operation of start key 248 also closes ground from the back contacts of relay 250 to the shutter magnet 258 which is also connected to battery 259. The energization of magnet 258 opens the shutter 244 and allows light from source 281 through collimating lenses 283 and 284 to pass through the film record 220 and magnifying lenses 285 to impinge upon the target 225. The photocell units 230 are numbered from 1 through 6 in Fig. 9 for each digit array. The photocell units 230 responsive to the message register number are arranged along the top of Fig. 9, and those of the call record are arranged beneath. The grouping of the six units 230 that are responsive to a digit are referred to as a photocell detector, and these detectors are designated 202 through 209. The light through the film falls upon the following photocell units 230 of the thousands, hundreds, tens and units detectors 202 through 205, respectively, of the message register number; 1, 2, 3, 4; 2, 3, 5, 6; 2, 5, 6; and 4, 5. Light also falls upon the 5; 1, 2, 3, 4, 5; 2, 4, 5; and 6 of the thousands, hundreds, tens and units detectors 206 through 209, respectively, of the call record number; and upon the pilot cell 300 shown in detail.

The photocell units 230 are structurally the same as the photocell units 30 described above. The photocell unit associated with the lens 227 is designated herein as photocell unit 300. The photocell unit 300 by way of example and the units 230 contain a photocell 231, a gas tube 228 and a capacitor 224. When the resistance of the photocell 231 is decreased when light impinges thereon the gas tube 228 is ionized and causes an associated register relay to operate. Each photocell unit 230 and the photocell unit 300 as well have a register relay associated therewith. When light impinges upon the photocell 231, for example, relay 274 operates and in a similar manner selected of the register relays in the registers 291 through 298 shown in Figs. 10 and 11 operate. The registers 291 through 294 are the message register number registers and the registers 295 through 298 shown in Fig. 11 are the call record registers. Each of the registers 291 through 298 comprises six register relays two of which are shown in the register 291.

Light falling upon the target or screen 225 activates at least one photocell unit 230 in each of the eight digit patterns or photocell detectors 202 through 209 and also activates the photocell unit or pilot unit 300 described above. The operation of the selected of photocell units 230 and the unit 300 causes the associated register relays, in which relay 274 is included, to lock up. When register relay 274 operates, it, in turn, causes the operation of the connector relay 302 by closing ground from its operated contact through the normal contact of the message register number connector relay 304 and the normal contact of relay 303. When relay 302 operates, it closes the twenty-four leads 315 from the call record registers 295 through 298 to the perforator magnets 290. The register leads 315 which were energized or grounded by the register relays in the registers 295 through 298 in a manner described above in reference to the modification shown in Figs. 3 through 5, cause the corresponding perforator magnets 290 to operate and impress the perforator tape 232. When connector relay 302 operates, it also grounds the lead 305 through its bottom operated contact to close an operating path for the perforator stepping magnet 254. The operation of the magnet 254 causes the bracket 271 to rotate in a clockwise manner and click one stop on the wheel 272. The wheel 272 and the cylinder 273 attached thereto cannot rotate at this time due to the stop 314. When, however, the magnet 254 releases, as is hereinafter described, the bracket 271 restores and causes the perforator cylinder 273 to move or rotate to the next position. When relay 302 operated, it also caused the operation of the relay 303 by connecting ground thereto from another of its operated contacts. Relay 303 is a slow operating relay which, upon operating, opens the operating circuit described above for the connector relay 302 causing it to release and in turn release the paper advance magnet 254 to step the paper strip 232 to the next position in readiness for the succeeding recording.

When relay 303 operates, as described above, it locks to ground through one of its operated contacts and a normal contact of relay 306 and also causes the message register number connector relay 304 to operate by connecting ground from the bottom normal contact of relay 302, through a normal contact of relay 306 and an operated contact of relay 303. When relay 304 operates, it connects the twenty-four leads 316 from the registers 291 through 294 to the perforator magnets 290 and, in addition, connects ground from its bottom operated contact to the twenty-fifth perforator magnet 290 which is at the right in Fig. 11. The operation of the twenty-fifth perforator magnet 290 indicates that this line or perforation is the message register number as distinguished from the call record number which was transcribed as described above. The ground leads 316 from the registers 291 through 294 cause corresponding perforations to be made in the paper 232 as a record of the message register number. When relay 304 operates, it also causes the stepper magnet 254 to pull up but not rotate wheel 272 by connecting ground thereto through another of its operated contacts. A ground connection is connected through still another of the operated contacts of relay 304 to the winding of relay 306 which is operated thereby. When relay 306 operates, upon the operation of relay 304, it opens the locking circuit of relay 303 causing it to release and, as hereinafter described, to release thereby the relay 304. When relay 304 releases it in turn releases the paper advance magnet 254 to cause the advancement of the perforator paper 232.

Figure 9:
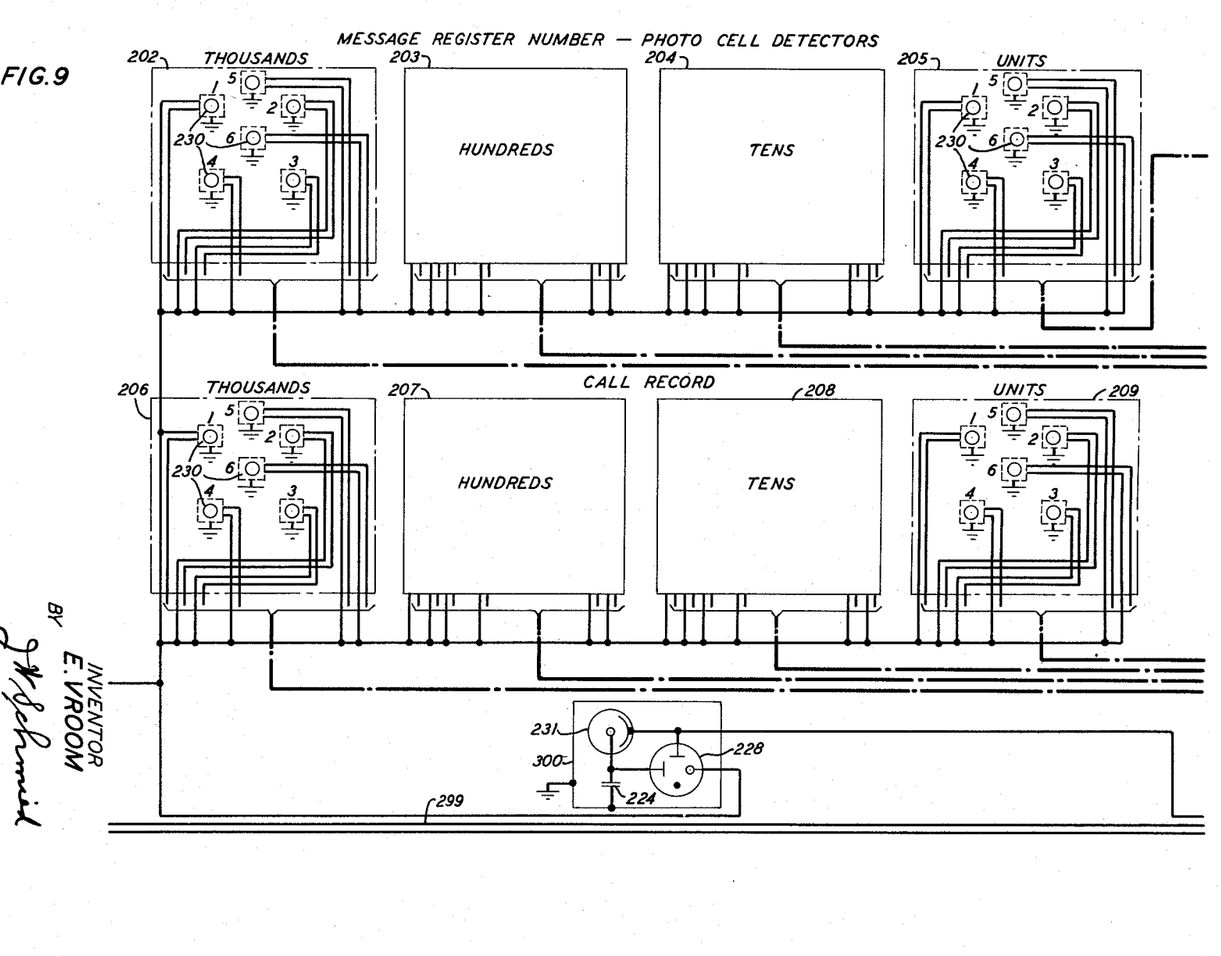
Figure 10:
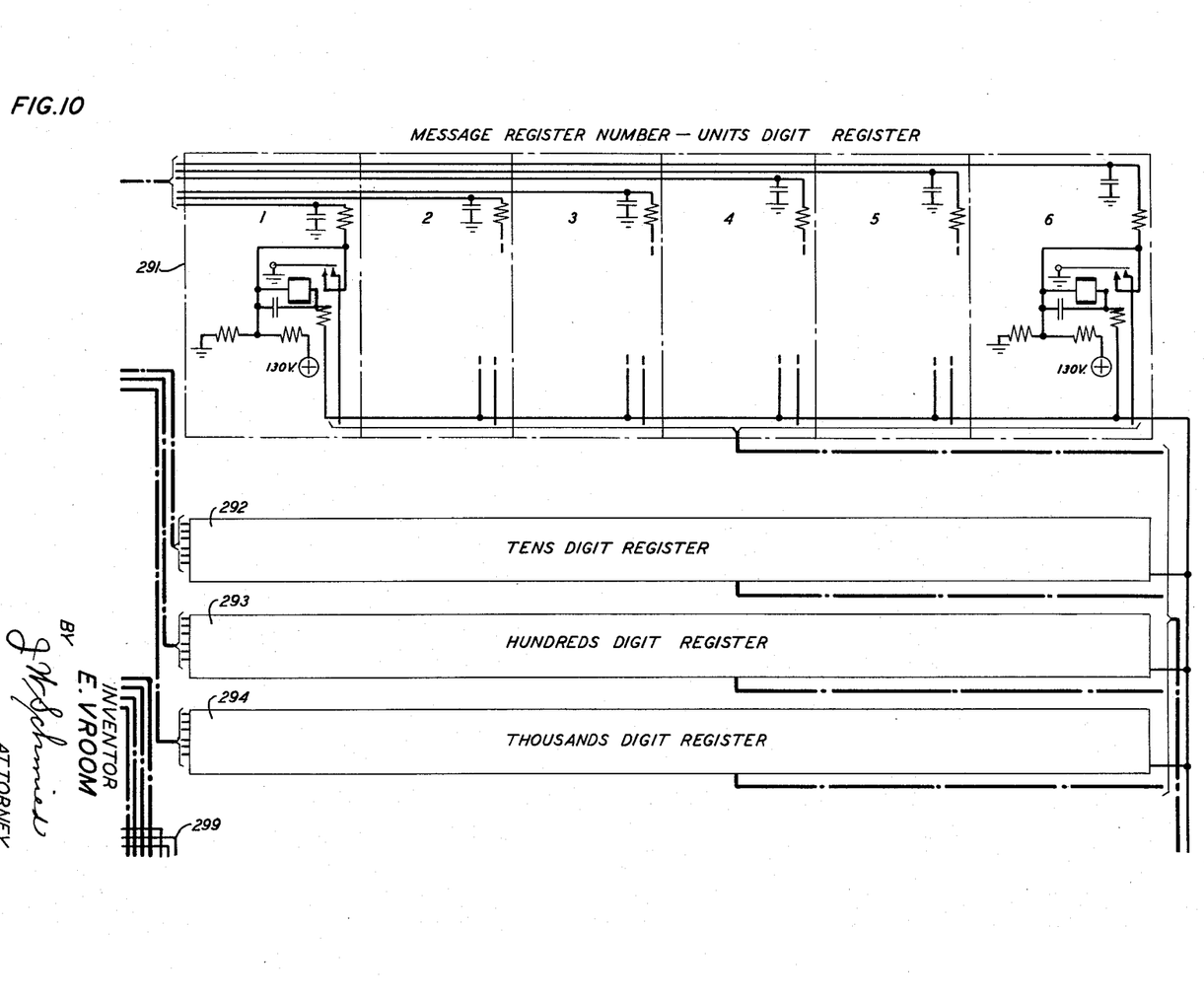

The operation of relay 304, as described above, also grounds the lead 308 to the relay 307 causing it to operate and to open the 130-volt supply upon lead 299 to restore the registers 291 through 298 to normal. Relay 250 in Fig. 9 is also operated when ground is connected to lead 308 to start the recycling operation. The operation of the recycling relay 250 removes ground from the shutter magnet 258 allowing it to release and the restoring spring 275 causes the shutter 244 to move up and shut off the light from the source 281. The operation of relay 250 also opens the operating circuit for relay 251 and operates the film advance magnet 261.

When relay 304 releases after the release of relay 303 it opens the operating path for relay 250 causing it to release and in turn cause the film advance magnet 261 to release and advance the film 220 one step. When the recycling relay 250 restores to normal, the ground from its back contact is closed to the shutter magnet 258 causing it to operate and reopen the shutter 244. Magnet 258 operates after magnet 261 releases. Light from the source 281 is then projected through a new section or unit 222 of the film 220 onto the target 225 and the plus 100-volt source 249 is reapplied to the relay 251 and the register relays in registers 291 through 299 and the register relay 274. A new cycle of operations proceeds in the manner described above to transcribe the intelligence upon the unit 222 in front of the shutter opening 280. These cycles continue until a complete column of 2000 units 222 is transcribed. Succeeding columns of the film 220 are transcribed thereafter by proper framing utilizing the knob 315. The film 220 thus advances automatically after each register is read, requiring two minutes to read and record 2000 records. The reframing operation to start the film for the succeeding column requires approximately two minutes and thus a total of approximately twenty minutes is required for the 10,000 registers to be read and transcribed.

Utilizing photocell targets such as 25 in Fig. 3 and 225 in Fig. 9 impose rigid requirements upon the message registers. The numbers on the message registers are structurally uniform so that the shadows of similar digits will shade or obscure the same or corresponding lenses 226 or 26. The message registers are lined up to insure uniform spacing of the records or units 222 or 22 upon the film and moreover the counters are not allowed to change their recording during the photographic procedure.

It is to be understood that the above-described arrangements are illustrative of the application of the principles of this invention. Numerous other arrangements may be devised by those skilled in the art without departing from the spirit and scope of the invention.

What is claimed is:

1. A device for converting numerals upon film strip to perforations upon a tape comprising light responsive apparatus; a light source casting an image of a number on said strip upon said light responsive apparatus; a registering circuit selectively energized by said light responsive apparatus comprising pilot photocell means for controlling the movement of said film strip and the continuity of the light from said light source to said light responsive apparatus; and a perforator selectively operable responsive to the energization of said circuit.

2. An automatic transcriber comprising a film record having a plurality of numbers arranged in columns; a source of light; a shutter controlling the passage of light from said source through said record; a target; an optical system between said record and said source and between said record and said target, said target having a plurality of arrays of light responsive devices selectively energized by the light through said record; a register circuit connected to said light responsive devices and operable responsive to the energization thereof; a perforating apparatus controlled by the operation of said circuit for providing perforations in accordance with the intelligence upon said record; and stepping means controlled by said circuit for stepping said record longitudinally and transversely so that each of said numbers in each of said columns comes between said light source and said target, said stepping means comprising ratchet wheels and magnetic means controlling the operation of said wheels, the rotation of one of said wheels providing a longitudinal displacement of said record and the rotation of the other of said wheels providing a transverse displacement of said record.

3. An automatic transcriber comprising a film record having a plurality of numbers arranged in columns; a source of light; a shutter controlling the passage of light from said source through said record; a target; an optical system between said record and said source and between said record and said target, said target having a plurality of arrays of light responsive devices selectively energized by the light through said record; a register circuit connected to said light responsive devices and operable responsive to the energization thereof; a perforating apparatus controlled by the operation of said circuit for providing perforations in accordance with the intelligence upon said record; and stepping means connected to said circuit for stepping said record longitudinally and transversely so that each of said numbers in each of said columns comes between said light source and said target.

4. An automatic transcriber comprising a film record having a plurality of numbers arranged in columns; a source of light; a shutter controlling the passage of light from said source through said record; a target; an optical system between said record and said source and between said record and said target, said target having a plurality of arrays of lights responsive devices selectively energized by the light through said record; a register circuit connected to said light responsive devices and operable responsive to the energization thereof; a perforating apparatus controlled by the operation of said circuit for providing perforations in accordance with the intelligence upon said record; and stepping means connected to said circuit for stepping said record longitudinally and transversely so that each of said numbers in each of said columns comes between said light source and said target, said stepping means comprising a film advance magnet, a film transverse magnet and a film transverse return magnet.

5. In an optical transcriber, the combination which comprises a film strip having a plurality of unit areas; a stepping apparatus for longitudinally and laterally moving said film strip; an optical system passing light through a positioned of said areas; a photocell target for transforming the intelligance upon said area to coded electric signals; and a control circuit operable by the electric signals from said target for providing an output and for controlling the operation of said stepping apparatus and the passage of light in said optical system through said film strip.

6. A device for converting filmed intelligence to perforated intelligence comprising a source of light; a six-photocell array, said photocells being selectively energizable by said source through said film; six-register and control circuits respectively associated with said photocells; a pilot photocell and control circuit energizable by said light source; and a perforator associated with each of said register and control circuits whereby the operation of said pilot control circuit and selected of said register and control circuits control the operation of said perforators, the movement of said film and the continuity of the path of light from said light source.

7. In a system of record transposition, means for projecting onto a scanning surface an image of a portion of a film record; storage means associated with said surface for interpreting and registering the intelligence upon said film record; a row of record perforators relating to said storage means; means whereby said perforators are operated in accordance with a storage manifestation communicated by said storage means; and pilot photocell means controlled by said projecting means for sequentially operating said projecting means so that said film record is entirely transposed to a perforated record.

8. An automatic transcriber comprising a film record having a plurality of numbers arranged in columns; a source of light; a shutter controlling the passage of light from said source through said record; a target; an optical system between said record and said source and between said record and said target, said target having a plurality of arrays of light responsive devices selectively energized by the light through said record; a register circuit connected to said light responsive devices and operable responsive to the energization thereof; a perforating apparatus controlled by the operation of said circuit for providing perforations in accordance with the intelligence upon said record; and stepping means connected to said circuit for stepping said record longitudinally and transversely so that each of said numbers in each of said columns comes between said light source and said target, said stepping means comprising a forward transverse stepping magnet, a return transverse magnet, a longitudinal stepping magnet, and means whereby said longitudinal and said return transverse magnets operate simultaneously.

9. In a translating and recording system, means to scan photoelectrically in succession images of a plurality of columns of digits; a register having a plurality of groups of storage elements with each group being identified with a corresponding one of said digits in each of said columns, means for setting the elements in each group according to the scanning of its corresponding digit image, apparatus to provide electrical pulses according to the settings of said storage elements, and pilot photocell means to sequentially control the operation of said scanning means so that all of said digits are automatically scanned; and means to make a perforated record in accordance with the impulses thus provided.

References Cited in the file of this patent

UNITED STATES PATENTS

| | | |
|---|---|---|
| 1,487,115 | McQuarre | Mar. 18, 1924 |
| 1,815,996 | Weaver | July 28, 1931 |
| 1,870,989 | Eldred | Aug. 9, 1932 |
| 2,000,403 | Maul | May 7, 1935 |
| 2,586,711 | Potts | Feb. 19, 1952 |